United States Patent [19]

Landolt

[11] E Patent Number: Re. 32,622

[45] Reissued Date of Patent: Mar. 15, 1988

[54] METHOD FOR THE MANUFACTURE OF MOLDS USING CASTING SAND OR ANOTHER MIXTURE OF RAW MATERIAL PARTICLES

[75] Inventor: Christoph Landolt, Flint, Mich.

[73] Assignee: George Fischer Foundry Systems, Inc., Holly, Mich.

[21] Appl. No.: 880,721

[22] PCT Filed: Dec. 9, 1982

[86] PCT No.: PCT/CH82/00131

§ 371 Date: Aug. 11, 1983

§ 102(e) Date: Aug. 11, 1983

[87] PCT Pub. No.: WO83/02078

PCT Pub. Date: Jun. 23, 1983

Related U.S. Patent Documents

Reissue of:

[64] Patent No.: 4,546,810
Issued: Oct. 15, 1985
Appl. No.: 531,827
Filed: Dec. 9, 1982

[30] Foreign Application Priority Data

Dec. 11, 1981 [DE] Fed. Rep. of Germany ..... 3149172

[51] Int. Cl.[4] ..... B22C 15/00
[52] U.S. Cl. ..... 164/37
[58] Field of Search ..... 164/37–40, 164/12, 15, 169, 195

[56] References Cited

U.S. PATENT DOCUMENTS

| | | | |
|---|---|---|---|
| 2,847,736 | 8/1958 | Pulvermacher . | |
| 3,170,202 | 2/1965 | Huston, Sr. et al. | 164/37 |
| 3,659,642 | 5/1972 | Vasilkovsky et al. | 164/169 |
| 4,289,194 | 9/1981 | Uzaki et al. . | |
| 4,306,609 | 12/1981 | Fischer et al. | 164/169 X |
| 4,415,015 | 11/1983 | Zadera | 164/169 X |
| 4,483,383 | 11/1984 | Tanner . | |

FOREIGN PATENT DOCUMENTS

| | | |
|---|---|---|
| 2249244 | 4/1974 | Fed. Rep. of Germany . |
| 2844464 | 4/1980 | Fed. Rep. of Germany . |
| 2141235 | 1/1973 | France . |
| 55-133847 | 10/1980 | Japan . |
| 55-141355 | 11/1980 | Japan . |
| 55-147462 | 11/1980 | Japan . |

OTHER PUBLICATIONS

Jörn "New Impact Molding Method for the Compaction of Clay Bonded Molding Materials", 68, *Giesserei* (Sep. 28, 1981).

Grakov et al., "Explosive Mold Compacting", 4, *Russian Castings Production* (1968).

The Impact Moulding Process–A Promising New Development", 67, *Giesserei* (1980).

*Primary Examiner*—Kuang Y. Lin
*Attorney, Agent, or Firm*—Marmorek, Guttman & Rubenstein

[57] ABSTRACT

In order to make casting sand or another moldable mixture, a pressure surge wave is used which has upper and lower limit values which values have been established by an optimal selection of a pattern of pressures. The other moldable mixture comprises particles of raw material, binder, water, and, if need be, additives. The rise in pressure takes place with an increasing pressure gradient, dp/dt, of at least 50 atmospheres (absolute)/-second. A minimum pressure of at least 2 atmospheres (absolute) is maintained for at least 0.01 second. The pressure drop takes place at a decreasing pressure gradient,—dp/dt, of up to about 2.0 atmospheres (absolute)/second. The disclosed values represent an optimalization, in view of a simple design and economy of operation, with a surprisingly good compacting.

26 Claims, 1 Drawing Figure

METHOD FOR THE MANUFACTURE OF MOLDS USING CASTING SAND OR ANOTHER MIXTURE OF RAW MATERIAL PARTICLES

Matter enclosed in heavy brackets [ ] appears in the original patent but forms no part of this reissue specification; matter printed in italics indicates the additions made by reissue.

FIELD OF THE INVENTION

The present invention relates to a method of manufacturing molds from casting sand or from an otherwise moldable mixture by the use of a pressure surge wave in a closed chamber. The other moldable mixture comprises particles of raw material, binder, water, and, if need be, additives.

BACKGROUND OF THE INVENTION

A number of processes are known whereby the manufacturing of molds is effected by means of a pressure surge wave. In such processes, a gas pressure is built up over a moldable mixture such as, for example, a casting sand, and then subsequently decreased.

The object of the invention is to select a range in pressure variation within which an optimal compaction of the moldable mixture is assured.

SUMMARY OF THE INVENTION

In accordance with the present invention, castings are made from casting sand or other moldable mixture by means of a pressure surge wave. The pressure surge wave is characterized by four parameters: these are the increasing pressure gradient, the maximum pressure, the duration of the maximum pressure, and the decreasing pressure gradient. The rise in pressure takes place with an increasing pressure gradient, dp/dt, of at least about 50 atmospheres (absolute)/second. A [maximum] pressure of at least about 2 atmospheres (absolute) is maintained for at least 0.01 seconds. The pressure drop takes place with a decreasing pressure gradient, −dp/dt, of up to 2.0 atmospheres (absolute)/sec. These values yield surprisingly good compacting of the casting sand and or other moldable mixture from which the castings are made.

BRIEF DESCRIPTION OF THE DRAWINGS

The FIGURE shows four pressure surge waves as a function of time, in accordance with an illustrative embodiment of the invention.

DETAILED DESCRIPTION OF THE INVENTION

Figure 1:
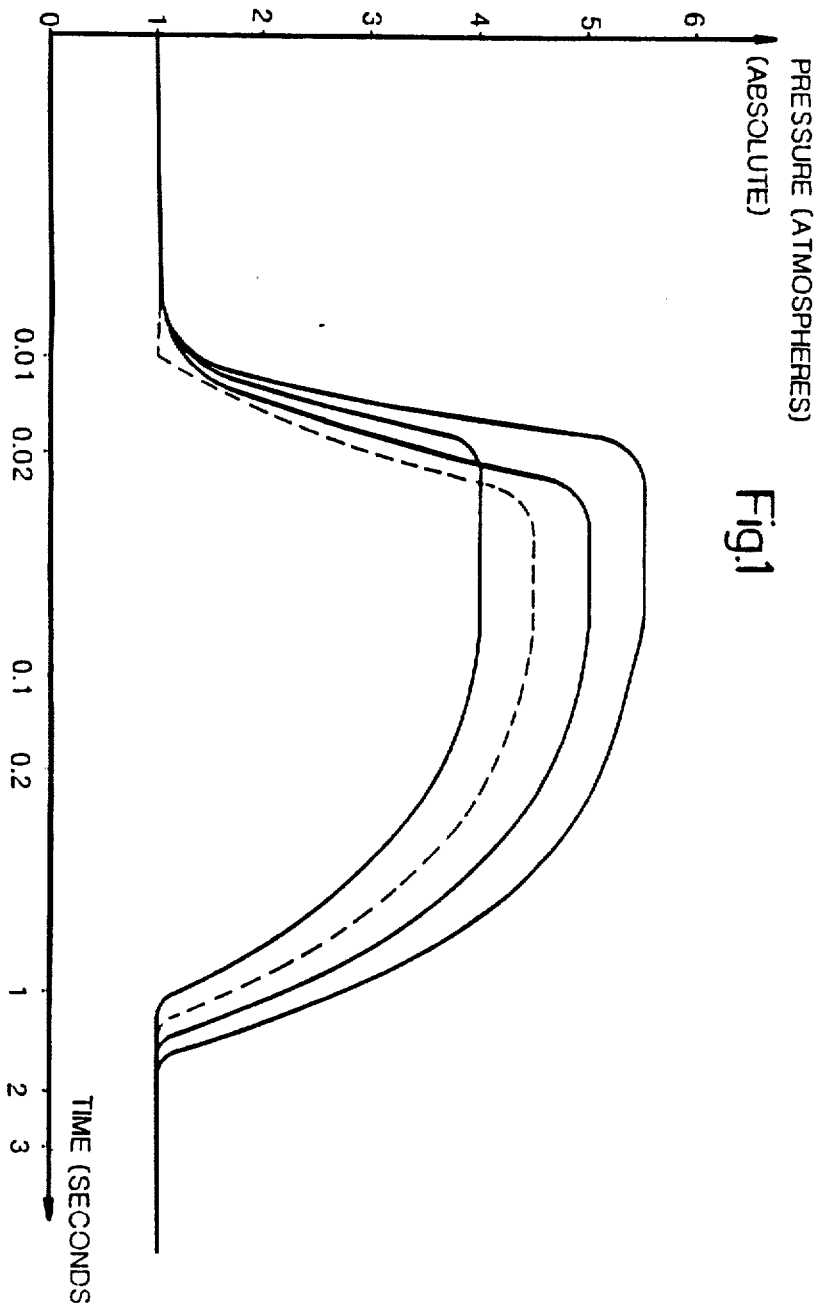

The pressure range is characterized bythe fact that the moldable mixture is exposed to a gas pressure of at least 2 atmospheres (absolute) using an increasing pressure gradient, dp/dt, of at least 50 atmospheres (absolute)/second, maintaining at least this pressure for at least 0.01 seconds and then allowing the pressure to drop back to normal pressure within at least 0.2 seconds from the onset of the pressure increase.

Theoretically, no upper limit is set for the pressure-rise gradient.

Several tests have shown that an increasing pressure gradient of about 600 atmospheres (absolute)/second is a value which represents a suitable limit regarding both the hardness of the sand mold and the choice of the pressure medium.

The pressure surge wave should be applied to the surface of the sand as a mass flow through change of the amount of air per unit time. The pressure surge may be produced by compressing a gas or by an exothermic reaction of an explosive gas mixture. The pressure surge wave should be reduced to a low final pressure, that is, finally reduced to normal pressure.

A pressure maximum of 4 to 5.5 atmospheres (absolute) in a combustion chamber represents an optimization between the desired strength properties of the sand molds and the cost of sealing the combustion chamber. [The maximum] *An elevated* pressure *of at least 2 atmospheres (absolute)* should be maintained for at least 0.01 second and may be [mainted] *maintained* for about 0.03–0.05 seconds.

With regard to the reduction of pressure, two oppositely directed phenomena must be weighed one against the other. On one hand, the pressure drop should not be too rapid, because cracks could form in the molds; whereas, on the other hand, too much time should not be taken for the pressure to drop, otherwise the cycle times for producing the molds would become too long. An upper limit would be in the range of about 2 atmospheres (absolute)/second, up to which limit, crack-free molds with a clean surface can be produced. The maximum pressure is reduced in a time ranging from 0.2 sec. to about 1.5 sec.

In the afore-described process use is made of four parameters to define a pressure surge. These parameters are the increasing pressure gradient, the maximum pressure, the duration of maximum pressure, and the decreasing pressure gradient. These parameters may be varied independently.

The FIGURE shows four pressure surges, all of which are characterized by increasing pressure gradients, maximum pressures, duration of maximum pressure, and decreasing pressure gradients in the aforementioned ranges in accordance with the present invention. Each of the surges starts at normal, i.e. atmospheric pressure and ends at normal, i.e. atmospheric pressure.

Additional influencing factors were investigated to determine the above-mentioned optimum values. Thus, a boundary surface concentration of the raw material particles of $10^{-9}$ to $5 \cdot 10^{-9}$ mole/centimeter$^2$, and especially, moreover, a concentration of 1.9 to $2.5 \cdot 10^{-9}$ mole/centimeter$^2$, has been found to be advantageous.

In addition, with regard to making a choice of raw material particles, a determination was made relating to the velocity of propagation of elastic longitudinal waves in such particles, wherein a value of 4 to 7 kilometers/second, and preferably, a velocity of 5.8 to 6.0 kilometers/second, was found to be especially favorable.

For the tests, use was made of raw material particles which had a major constituent which was silicon dioxide. These particles had a compactability which lay between 27 and 60%, and preferably, 32 to 45%.

Compactibility relates to the decrease in volume of the casting mixture after the pressure surge is applied thereto.

Advantageously, the process described finds an application in the precise molding of a casting mold by using a pattern wherein the derived optimum values are so adjusted and combined that a pressure of 80 to 180 Newtons/centimeter$^2$ is produced on the surface of the pattern.

The limiting values thus determined for the pressure rise, for the maximum value and for the pressure reduction, yield data for the optimal operation of equipment for compacting sand.

I claim:

1. A method for manufacturing molds from casting sand or other mixture comprising raw material particles, binder and water, by applying a pressure surge wave to said casting sand or other mixture in a closed chamber, said pressure surge wave being formed by a process comprising the steps of:

(a) starting from atmospheric pressure in said chamber, increasing said pressure with a pressure gradient of at least about 50 atmospheres/sec to a [maximum] pressure of at least about 2 atmospheres;

(b) maintaining said [maximum] pressure [of at least] *in said chamber equal to or above* about 2 atmospheres for at least about 0.01 seconds;

(c) reducing said pressure [from said maximum pressure] to atmospheric pressure within [at least] about 0.2 seconds *or more* from the initiation of the pressure increase.

2. A process according to claim 1, characterized in that the increasing pressure gradient has a maximum value of about 600 atmospheres (absolute)/sec.

3. A process according to claim 1, characterized in that the maximum value of the pressure p lies between about 4 and about 5.5 atmospheres (absolute).

4. A process according to claim 1, characterized in that the maximum gas pressure is maintained for 0.03 to 0.05 seconds.

5. A process according to claim 1, characterized in that the gas pressure is reduced within about 1.5 seconds.

6. A process according to claim 1, characterized in that the reduction in pressure is carried out using a decreasing pressure gradient up to about 2.0 atmospheres (absolute)/second.

7. A process according to claim 1, characterized in that use is made of raw material particles having a propagation velocity for elastic longitudinal waves of 4 to 7 kilometers/second, and preferably of 5.8 to 6.0 kilometers/second.

8. A process according to claim 1, characterized in that use is made of raw material particles whose boundary surface concentration is $10^{-9}$ to $5 \cdot 10^{-9}$ mole/centimeter$^2$, and preferably $1.9 \cdot 10^{-9}$ to $2.5 \cdot 10^{-9}$ mole/centimeter$^2$.

9. A process according to claim 1, characterized in that the raw material particles comprise mainly silicon dioxide.

10. A process according to claim 1, characterized in that the pressure rise is effected by compressing a gas.

11. A process according to claim 1, characterized in that the pressure rise is produced by the exothermic reaction of an explosive gas mixture.

12. A process according to claim 1, characterized in that use is made of a mixture with a volume capable of being compacted by 27 to 60% upon application of said pressure surge wave, and preferably by 32 to 45%.

13. The use of the process according to claim 1, characterized in that a maximum pressure of 80 to 180 Newtons/centimeter$^2$, is produced on the surface of a pattern.

*14. A method for manufacturing molds from casting sand or other mixture comprising raw material particles, binder and water, by applying a pressure surge wave to said casting sand or other mixture in a closed chamber, said pressure surge wave being formed by a process comprising the steps of:*

*(a) starting from atmospheric pressure in said chamber, increasing said pressure with a pressure gradient of at least about 50 atmospheres/sec to a maximum pressure of at least about 2 atmospheres;*

*(b) maintaining said maximum pressure of at least about 2 atmospheres for at least about 0.01 seconds;*

*(c) reducing said pressure from said maximum pressure to atmospheric pressure within about 0.2 seconds or more from the initiation of the pressure increase.*

*15. A process according to claim 14, characterized in that the increasing pressure gradient has a maximum value of about 600 atmospheres (absolute)/sec.*

*16. A process according to claim 14, characterized in that the maximum value of the pressure lies between about 4 and about 5.5 atmospheres (absolute).*

*17. A process according to claim 14, characterized in that the maximum gas pressure is maintained for 0.03 to 0.05 seconds.*

*18. A process according to claim 14, characterized in that the gas pressure is reduced within about 1.5 seconds.*

*19. A process according to claim 14, characterized in that the reduction in pressure is carried out using a decreasing pressure gradient up to about 2.0 atmospheres (absolute)/second.*

*20. A process according to claim 14, characterized in that use is made of raw material particles having a propagation velocity for elastic longitudinal waves of 4 to 7 kilometers/second, and preferably of 5.8 to 6.0 kilometers/second.*

*21. A process according to claim 14, characterized in that use is made of raw material particles whose boundary surface concentration is $10^{-9}$ to $5 \times 10^{-9}$ mole/centimeter$^2$, and preferably $1.9 \times 10^{-9}$ to $2.5 \times 10^{-9}$ mole/centimeter$^2$.*

*22. A process according to claim 14, characterized in that the raw material particles comprise mainly silicon dioxide.*

*23. A process according to claim 14, characterized in that the pressure rise is effected by compressing a gas.*

*24. A process according to claim 14, characterized in that the pressure rise is produced by the exothermic reaction of an explosive gas mixture.*

*25. A process according to claim 14, characterized in that use is made of a mixture with a volume capable of being compacted by 27 to 60% upon application of said pressure surge wave, and preferably by 32 to 45%.*

*26. The use of the process according to claim 14, characterized in that a maximum pressure of 80 to 180 Newtons/centimeter$^2$, is produced on the surface of a pattern.*

* * * * *